US005978882A

United States Patent [19]
Adams

[11] Patent Number: 5,978,882
[45] Date of Patent: Nov. 2, 1999

[54] REAL-MODE, 32-BIT, FLAT-MODEL EXECUTION APPARATUS AND METHOD

[75] Inventor: Phillip M. Adams, Salt Lake City, Utah

[73] Assignee: Novell, Inc., Provo, Utah

[21] Appl. No.: 08/842,962

[22] Filed: Apr. 25, 1997

[51] Int. Cl.[6] .................................................. G06F 12/06
[52] U.S. Cl. .............................. 711/2; 711/208; 711/209; 711/212; 712/227
[58] Field of Search ................................... 395/568, 733, 395/500, 570, 734; 711/2, 163, 208, 209, 212; 712/227

[56] References Cited

U.S. PATENT DOCUMENTS

| | | | |
|---|---|---|---|
| 5,125,087 | 6/1992 | Randell | 395/568 |
| 5,144,551 | 9/1992 | Cepulis | 395/425 |
| 5,237,669 | 8/1993 | Spear et al. | 395/400 |
| 5,274,834 | 12/1993 | Kardach et al. | 395/733 |
| 5,414,848 | 5/1995 | Sandage et al. | 395/650 |
| 5,517,651 | 5/1996 | Huck et al. | 395/775 |
| 5,555,395 | 9/1996 | Parks | 395/472 |
| 5,596,735 | 1/1997 | Hervin et al. | 395/586 |
| 5,603,014 | 2/1997 | Woodring et al. | 395/500 |
| 5,642,491 | 6/1997 | Rose et al. | 711/2 |
| 5,701,493 | 12/1997 | Jaggar | 395/734 |

OTHER PUBLICATIONS

IBM Technical Disclosure Bulletin, vol. 18, No. 3 (Aug., 1975), pp. 692–694.
IBM Technical Disclosure Bulletin, vol. 30, No. 11 (Apr., 1988), pp. 162–165.
Dilworth, John B., "An 80386 Assembler In Forth," *Dr. Dobb's Journal* (Oct., 1988), pp. 28–30, 33–35.
Fried, Stephen, "Accessing Hardware from 80386 Protected Mode Part I," *Dr. Dobb's Journal* (May, 1990), pp. 92–96 and 98.
Hewlett–Packard (hp60083.0104), "(Part 2 of 3) Opcode Extension Assignments," manual published Jun., 1987.
Hewlett–Packard (hp60083.0105 "(Part 3 of 3) Opcode Extension Assignments," manual published Jun., 1987.
Hewlett–Packard (hp300102.0060), "Series 300, Model 350 only ecclogger (1M)," manual published Aug., 1992.
Intel, "386DX™ Microprocessor High Performance 32–Bit Chmos Microprocessor With Integrated Memory Management," manual (Apr., 1989).

*Primary Examiner*—John W. Cabeca
*Assistant Examiner*—Fred F. Tzeng
*Attorney, Agent, or Firm*—Madson & Metcalf

[57] ABSTRACT

Flat-model, 32-bit, real-mode execution may be obtained in an INTEL™ X86-compatible processor of a computer to increase address space, while handling interrupts transparently. A protected-mode operating system is not required. A LOADALL instruction available to an operating system may load hidden cache descriptor registers of a processor with the base addresses, segment limits, and other attributes consistent with 32-bit, real-mode operation to provide 32-bit addressing. Interrupts, would normally interfere with the contents of the hidden cache descriptor registers. A new interrupt vector table is provided, with each new vector therein pointing to one of the new interposer routines provided. Upon receipt of an interrupt, a new interrupt vector points to an interposer routine, which saves the state of the hidden cache descriptor registers. The interposer routine then simulates the interrupt to an appropriate interrupt service routine by vectoring through the old or original interrupt vector table to the interrupt service routine. After its execution, the interrupt service routine provides an interrupt return to the calling interposer routine. The interposer routine then restores the state of the hidden cache descriptor registers to the 32-bit, flat-model execution state. The interposer routine may then provide its own interrupt return, rendering its own operation transparent to both the incoming interrupt and the execution conforming thereto.

19 Claims, 6 Drawing Sheets

REAL-MODE, 32-BIT, FLAT-MODEL EXECUTION APPARATUS AND METHOD

BACKGROUND

1. The Field of the Invention

This invention relates to computer systems and, more particularly, to novel systems and methods for real-mode addressing of computer memory above the one megabyte limit currently imposed by real-mode operating systems, and without resorting to protected-mode operating systems with their inherent complexity and overhead.

2. The Background Art

Computers relying on processors (CPUs) such as the X86 family of Intel processors, may operate in real mode or protected mode. Real-mode operating systems rely on 16-bit addressing. Protected-mode operating systems operate with 32-bit addressing. Real-mode addressing schemes may not create and use addresses greater than 20 bits, corresponding to approximately one megabyte of address space. Address space is simply a number in a mathematical space, but limits the ability of a processor to access the random access memory (RAM) or other memory above one megabyte.

One may think of "real-mode" addressing as 20-bit addressing. Should 4 gigabytes (a 32-bit number) of memory become available, a 20-bit addressing scheme cannot address more than about 1 megabyte of the 32-bit address space. Thus, in real mode, only approximately one four-thousandth of the total available memory or address space could actually be accessed by the processor.

Protected-mode operating systems may use addresses up to 32 bits, corresponding to approximately four gigabytes of memory. Operation in protected mode may provide descriptor tables resident in memory. The descriptor tables may include a global descriptor table (GDT), a local descriptor table (LDT), and an interrupt descriptor table (IDT). Each descriptor table contains descriptors. A descriptor may be thought of as one row of a table, for example. Within each descriptor (row) may be an access rights field, a base physical address field, and a segment length field.

During operation of a processor, the contents of a particular descriptor in any particular descriptor table (e.g., GDT, LDT, or IDT) may be loaded into a hidden cache descriptor register associated with a particular segment register of the processor. The processor relies on the hidden cache descriptor registers to perform the processor's addressing function. Since protected mode permits 32-bit addressing, the hidden cache descriptor registers must also contain sufficient capability to support 32-bit addressing.

However, in real mode, the hidden cache descriptor registers are limited by the real-mode loading scheme. Any time a segment register is loaded in real mode, a corresponding hidden cache descriptor register is loaded with values that limit the addressing functionality thereof.

For example, the base address will never be greater than a 20-bit value. The segment length may never be larger than a 16-bit value. Likewise, the access rights are set in accordance with the limitations and operations of real mode. The D/B bit is set to 16-bit addressing. Also, the access rights for the code segment register, data segment register, and the other segment registers, may all have a common value allowing all segments to have read, write, and execute access for the processor with respect to all segments.

By contrast, in protected mode, code segments are typically limited to read access and execute access only. Data segments may typically be limited to read access and write access, with no execute access permitted. The extra segment register, stack segment register, FS register and GS registers are typically treated as data registers.

Thus, in protected mode, certain operations by the processor are protected. Instead, real-mode operation allows all operations for all segments. Real mode is sometimes seen as a free-for-all that may destroy code or data without security measures intervening.

The price for protected mode may be paid in several ways, or exacted in several ways. From a programming perspective, the addressing model is much more complex than that for real mode Accordingly, addressing schemes are more complex to program. Thus, operating systems become substantially more complex to accommodate the protection mechanism implemented by the various descriptor tables (GDT, LDT, IDT). From a processor's point-of-view, management of the descriptor tables becomes substantial. A 15% degradation in performance is typical to support the loading and unloading of the hidden cache descriptor registers from the descriptors contained in any appropriate descriptor table.

What is needed, is an apparatus and method for achieving the addressing capability of a protected-mode operating system, without the attendant overhead and commensurate degradation of performance. Certain protections provided by a protected-mode operating system are desirable, and should be maintained. Thus, a real-mode 32-bit, flat-model execution is needed.

BRIEF SUMMARY AND OBJECTS OF THE INVENTION

In view of the foregoing, it is a primary object of the present invention to provide 32-bit, real-mode, flat-model execution in a processor.

It is another object of the present invention to provide management of the contents of the hidden cache descriptor registers associated with a processor, in order to properly handle interrupts and provide certain protections normally available only in protected mode, thus achieving the reliability and performance normally associated individually with protected mode and real mode, respectively.

Consistent with the foregoing objects, and in accordance with the invention as embodied and broadly described herein, an apparatus and method are disclosed in certain embodiments of the present invention as including a processor with associated registers and memory, programmed to provide reliable, real-mode, 32-bit, flat-model execution of the processor. In one embodiment, executable and non-executable data structures may be compiled and loaded into memory for properly handling interrupts whereby, the hidden cache descriptor registers associated with the processor may be configured in a state to support the real-mode, 32-bit, flat-model execution. The state may be saved and restored as needed while interrupts are serviced. Thus, addressability is maximized for the processor, while the handling of interrupts is transparent.

An apparatus and method in accordance with the invention provides the simplified execution associated with real mode, while providing a robust addressing capability corresponding to that of protected mode. These benefits are provided by direct, programmatic control of the contents of the hidden cache descriptor registers while operating in real mode.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
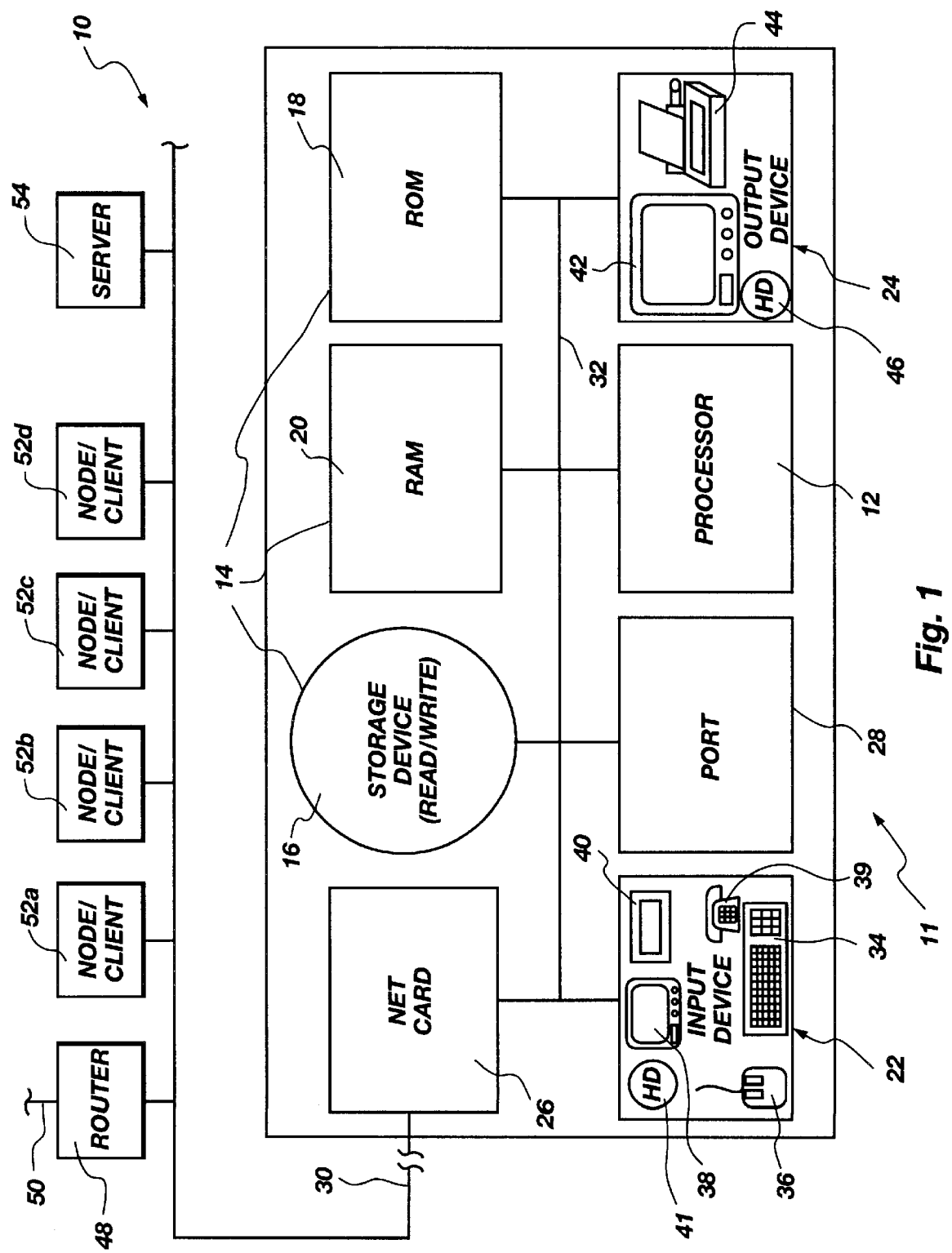
FIG. 1 is a schematic block diagram of an apparatus for implementing an embodiment of the invention.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 6, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout. Reference numerals having trailing, lower-case, alphabetical designations, are typically specific instances of an item or class having the same reference numeral. Thus, herein, a register 102 may be any one of the registers 102a, 102b, etc. or may indicate all of such registers 102a, 102b, etc.

Referring now to FIG. 1, an apparatus 10 may implement the invention on a single node 11, (client 11, computer 11) containing a processor 12 or CPU 12. The CPU 12 may be operably connected to a memory device 14. A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like. Similarly, a scanner 40 may be used to receive graphical inputs which may or may not be translated to other character formats. The hard drive 41 or other memory device 41 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 52a, 52b, 52c, 52d) may have various communication capabilities.

In certain embodiments, a minimum of logical capability may be available in any node 52. Note that any of the individual nodes 52a–52d may be referred to, as may all together, as a node 52. E may contain a processor 12 with more of less of the other devices 14–44.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

In any event, addressing may be required between devices 12–54 in an apparatus 10. Addressing space is a mathematical construct. However, addressing space controls an ability to process numbers and to address available memory in all memory devices 14. Especially limiting is the ability to address increased RAM 20 during execution of the processor 12. Addressing space, and true addressing of memory 20, 18, is limited by a highest number that may be stored in a limiting register in the processor 12.

Figure 2:
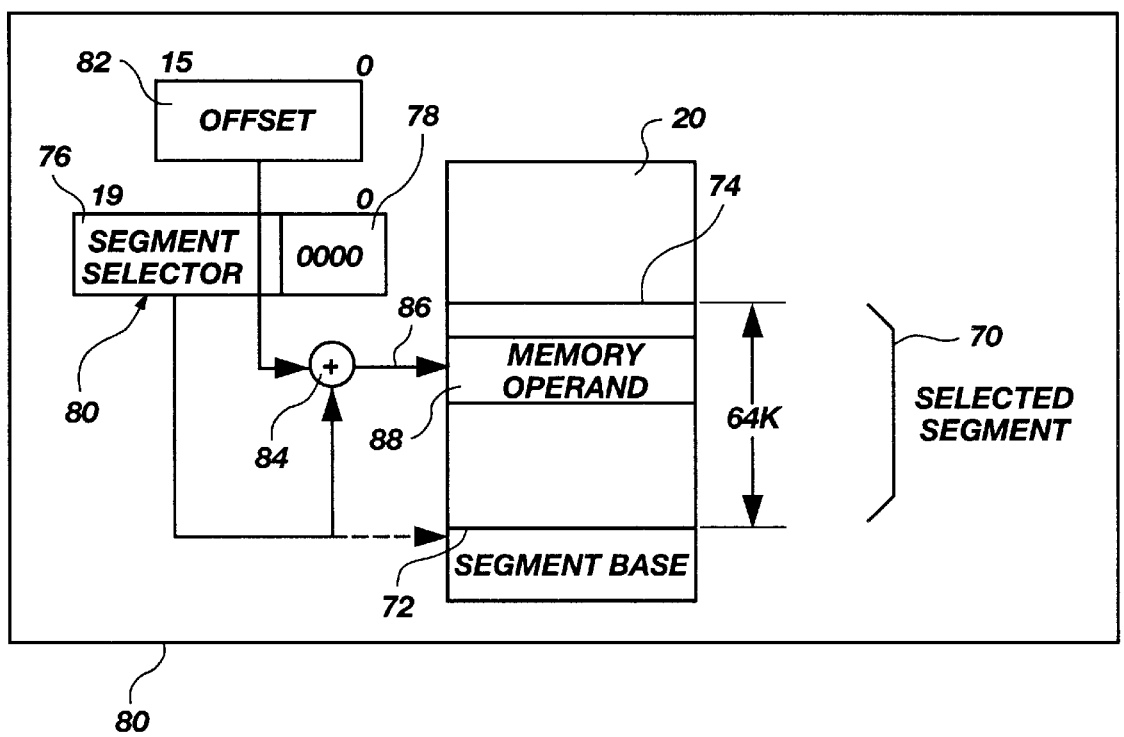
FIG. 2 is a schematic block diagram of a memory device of FIG. 1 configured for addressing in real mode, consisting with an apparatus and method of the invention.
Figure 3:
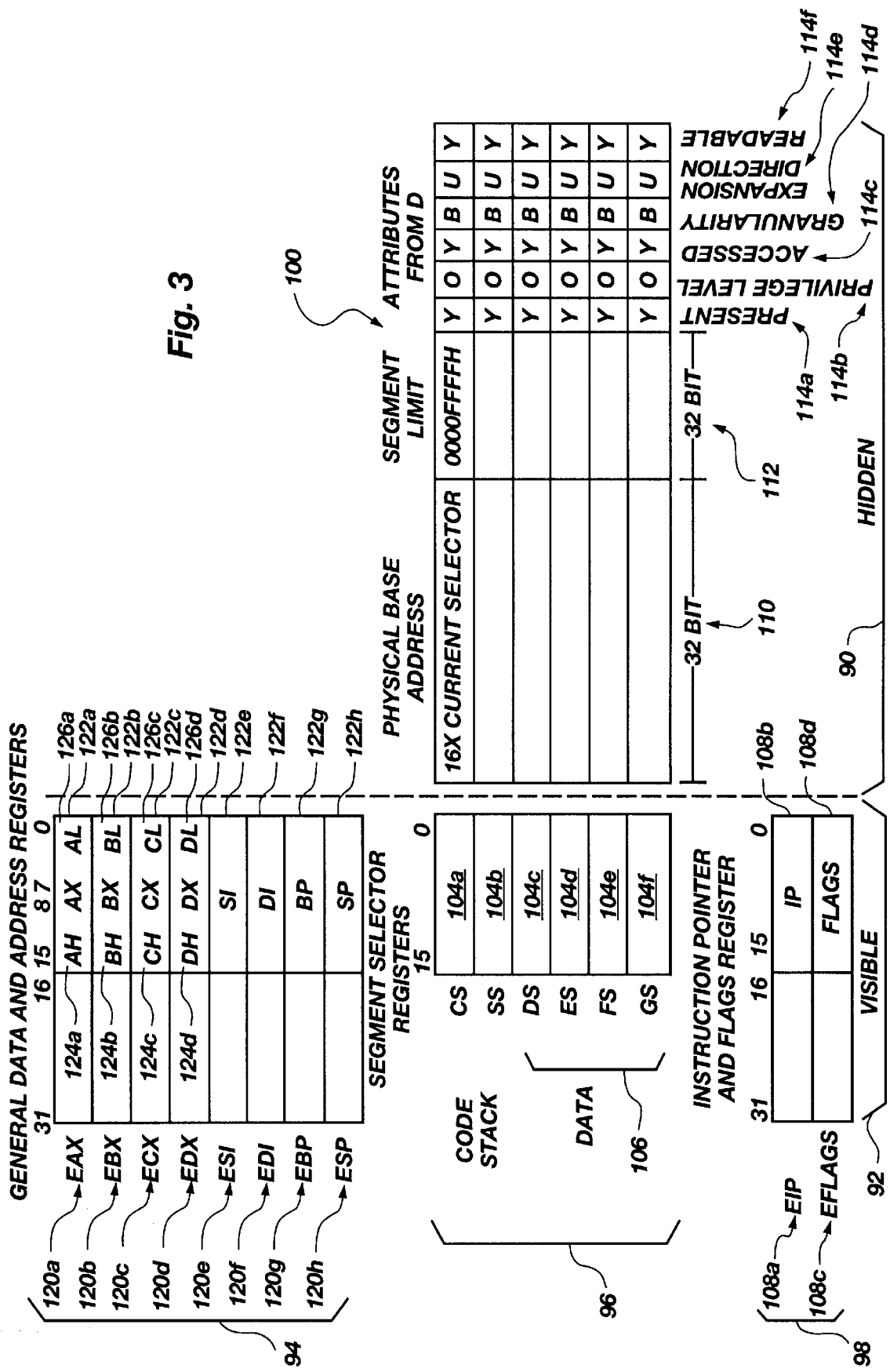
FIG. 3 is a schematic block diagram of the physical registers and hidden registers corresponding to the apparatus of FIGS. 1 and 2.
Figure 4:
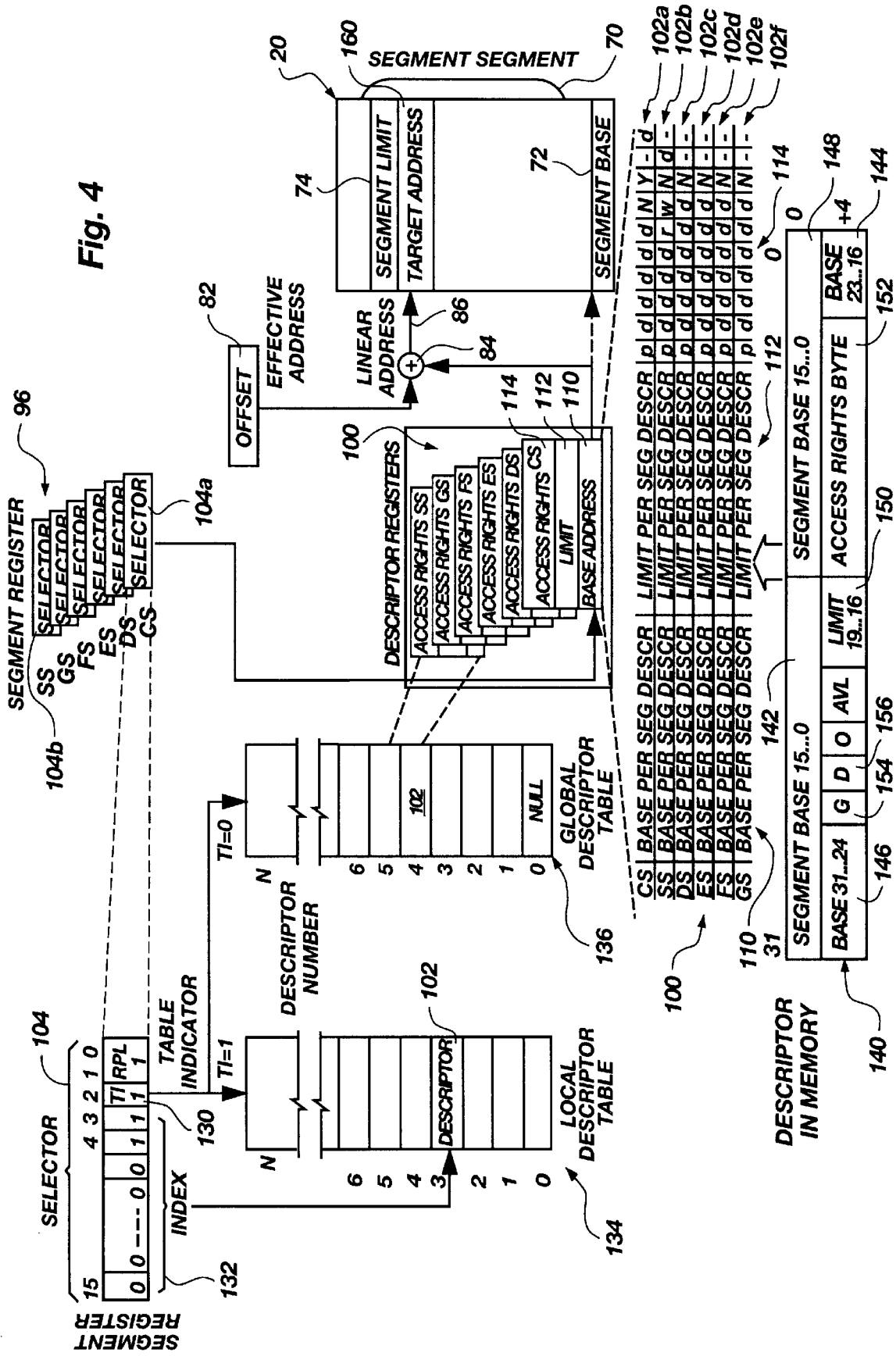
FIG. 4 is a schematic block diagram illustrating the relationships and operation of the registers and memory devices of FIGS. 1–3.

Referring now to FIG. 2, and generally to FIGS. 2–4, a segment 70 may be identified in a memory device 20. In general, a memory device 14 may refer to addressable memory such as ROM 18, RAM 20, and the like. Memory 20 customarily refers to the operating memory 20 or RAM 20 used by the processor 12 during execution. The segment 70 may have associated therewith a base 72, sometimes referred to as a segment base address 72, or simply a segment base 72.

The segment base 72 is a value corresponding to a location in memory 20. A limit 74, also referred to as segment limit 74, identifies an extent of the segment 70 beyond the base 72. A selector 76 provides a value for addressing locations within a segment 70. Segment base addresses 72 may be restricted to being located at one of the 16-byte boundaries, into which the memory 20 is subdivided. Accordingly, a shift 78 is added to (multiplied by, depending on how the values are viewed or expressed) the selector 76 (segment selector 76) to form an address 80. The address 80 is referenced with respect to the segment base 72.

An offset 82 may store a value corresponding to the segment base 72. Thus, the offset 82 when summed 84 (add operation 84) with the address 80 provides a pointer 86. The pointer 86, or output 86 identifies a beginning point or base location of an operand 88, also referred to as a memory operand 88.

Thus, any operand 88 may be addressed directly in real mode. A segment base 72 may be identified by an offset 82. The offset 82 may be thought of as identifying each of the segments 70, each beginning at a 16-byte boundary. The boundaries are counted out by the segment selector 76 in 16-byte increments enforced by the shift 78. Thereby, an offset 82 determines a location of an operand 88 within a segment 70.

A segment register 76 stores a value representing a base address 72 of a segment 70. A segment 70 may be as small as 16 bytes or may be as large as 65,536 bytes of memory 20. Each byte of memory 20 is addressable, but the memory 20 is broken into 16-byte blocks for purposes of improved efficiencies in addressing.

Accordingly, in order to address 1 megabyte of data, an addressing scheme with a 16-bit format requires a shift 78 of four additional bits. The four additional bits effectively multiply the available 16 bits to 20 bits (approximately 64 kilobyte space to just over 1 megabyte of space). An offset value 82 may be thought of as a number selected between 1 and 65,536, corresponding to a position or an address of and operand 88 within a segment 70.

Likewise, a segment 70 may be thought of as any of a number (from 16 to 65,536) of potential blocks of base addresses 72. Each block or segment 70 may itself, then, hold and address up to 65,536 internal entries 88. Each internal entry 88 is located at a position between 1 and 65,536, corresponding to a 16-bit offset 82 within a segment 70.

The number of segments 70 may vary from as little as 16 to as many as 65,536. The size of each segment 70 may vary from as low as one 16-byte block up to a 65,536 byte block. Thus, the addressability is 20 bits.

However, addressability may be traded off between numbers of segments 70 and positions 88 within segments. The number of segments and the number of positions 88 cannot be 65,536×65,536. However, between a maximum of 65,536 and a minimum of 16, each of the segments 70 and the positions 88 within segments may be traded off to achieve some optimal combination.

There need be no hardware paging involved with segmentation. Rather, segment sizes may be selected to be of variable length between 16 bytes and 65,536 bytes, in 16-byte minimum increments. The number of segments 70 may be from 16, to 65,536 according to the 16 bit segment register 76, 104.

Referring now to FIG. 3, and generally to FIGS. 2–4, addressing and other features may rely on a combination of hidden registers 90 and visible registers 92. Visible registers 92 are available to a programmer. Accordingly, a programmer may load visible registers 92 with desired values. By contrast, hidden registers 90 are typically available only to an operating system. The hidden registers 90 may be protected by various schemes, including privilege levels enforced by an operating system.

The real-mode addressing scheme of the X86 family of processors uses a segment register 76 to identify which segment 70 (from 16 bytes to 64K bytes) is being referenced. The 386 architectures and beyond have the hidden registers 90. The program-visible registers 92, including the segment registers 76 (e.g. registers 96) are the same size as the registers of the X86. Each is 16 bits long. Two additional registers (FS and GS) are added, but do not substantially affect addressability.

General registers 94, also called general data and address registers 94, may be used at will by a programmer for manipulating OP-codes and the like. Selectors 96, alternatively called segment selectors 96 or segment selector registers 96, may provide addressing within memory 20. Registers 98, also called instruction pointer and flags register 98 may be used to set flags or to link (chain, advance) to an instruction. The leading letter "E" in the labeling indicates extended registers 94, 98 for holding 32-bit values.

The descriptor registers 100, also called hidden cache descriptor registers 100 or HCDR 100, are typically loaded directly by an operating system according to selection of real-mode or protected-mode operation of the associated operating system. Each of the individual hidden cache descriptor registers 102 (e.g. descriptor registers 102a, 102b, . . . 102f) corresponds to a particular, visible, segment selector register 104 (e.g. selectors 104a, 104b, . . . 104f).

Operations using a particular selector 104, as controlled by an executable, application, or program, or directly by a programmer, automatically invoke the corresponding hidden cache descriptor register 102, controlled by the operating system. The selector 104a is used for designating a code segment 70. The selector 104b is used to indicate a stack segment 70. The selectors 104c–104f are treated as data registers 106.

The stack segment register 104b is used to identify an address associated with a stack. Thus, the stack segment register 104b may contain a value corresponding to a base address of a stack segment in the memory device 20. A stack pointer represents an offset that is provided from a register and corresponds to an offset 82 within the stack segment 104b.

It is important to understand that although about a megabyte (20 bits) of addressing space is available, the actual address or addressability is limited to 65,536 address locations or 65,536 bytes, until or unless a segment register 76, 104 changes. A code segment register 104a, a data segment register 104c, an extra (sometimes) environment segment register 104d, and a stack segment register 104b may each be loaded with a single value between 1 and 65,536, a 16-bit value. However, until such contents of the respective segment register 104 are changed, only the 65,536 bytes addressable by an offset value 82 may be addressed.

Changing the contents of a segment register 76, 104, to thus change segments 70 to increase addressing, is a rather "expensive" operation. Up to 15 bytes in any 16 byte block may be discarded or empty. However, the architecture originally conceived for the X86 family of processor by INTEL is not a "paged" architecture, the addressing scheme does not throw away 65,536-byte blocks.

Note that code addressability has the same difficulty as data addressability. For example, a code register 104a and an extra register 104d–104f each have the same 16 bits of addressability as the data segment register 104c.

Interestingly, a data segment register 104c may address the same or some overlapping space that is also addressed by a code register 104a. An application or program that is running may within itself determine what it needs and when, to avoid writing over information that will be needed in the future. In such a circumstance, no reason exists for exclusive addressing by the code segment register 104a or the data segment registers 104c–104f.

Thus, each of the code segment registers 104a and data may address all or part of the entire 20-bit (approximately 1 megabyte) of addressable space in memory 20. Note that this is far more flexible than hardware paging. Hardware paging, by contrast, would have allocated memory 20 in very large blocks rather than the smaller paragraphs of the segmented memory architecture.

The instruction pointer and flags register 98 may be treated differently, depending on whether operation is with 16-bit or 32-bit operation. Accordingly, an instruction pointer register 108a may be used in its entirety or an instruction pointer register 108b may use only an initial 16-bits thereof. Similarly, a flags register 108c may be used in its entirety, or a flags register 108d may use only the first 16-bits thereof.

In FIG. 3, the hidden cache descriptor registers 100 (e.g. 102a–102f) each contain a base 110, also called a base address 110, or base address register 110. This register 110 stores a value identifying a physical base address 72 of a segment 70 in memory 20. Similarly, a limit register 112, alternatively called a segment limit 112 or limit register 112 stores a value identifying a segment limit 74 in memory. A segment limit 112 may be thought of as corresponding to a maximum permissible offset 82.

One may commonly speak of a register 110, 112 as if the register 110, 112 were the value and vice versa. Thus, a register 110 and a base 72 may often be referred to interchangeably. Likewise, a register 112 and a segment limit 74 may also be referred to interchangeably. In reality, however, a register 110, 112 holds a value identifying a location 72, 74 respectively, in memory 20.

Each hidden cache descriptor register 102 includes several attribute registers 114. The attribute registers 114 (e.g. 114a–114k) control several operations.

The present register 114a identifies whether or not a corresponding descriptor register 102 is present in memory 20. The privilege level register 114b indicates a privilege level from 0 to 3. A privilege level 0 indicates an operatingsystem-level of privilege (most privileged). A privilege level of 3 indicates an application-level of privilege (least privileged).

An accessed register 114c indicates whether a particular descriptor register 102 (and the memory location it points to) has been accessed. If not accessed, the contents of the memory location may be removed from RAM 20.

The granularity register 114d is sometimes referred to as the granularity bit 114d. Each of the registers 114 may be referred to as a particular bit. In certain circumstances, eight of the registers 114 are combined and referred to as an access rights byte. The granularity bit 114d may be set to provide byte granularity or page granularity.

An expansion direction register 114e indicates whether a segment 70 expands up or expands down from a base 72. The readable bit 114f, writable bit 114g, and executable bit 114h (registers 114f–114h) indicate control of processing. As the names indicate, certain memory operands 88 in memory 20 may be readable only, writable only, both readable and writable, as needed. Similarly, a particular memory operand 88 may be data, or may be executable code. Accordingly, a hidden cache descriptor register 102 may so indicate by the access registers 114 or access bits 114.

A stack size bit (register) 114j may indicate a word size for elements to be stored in a stack in an operand 88 in memory 20. The stack size bit 114j may indicate 16-bit words or 32-bit double words may be stored.

A conforming privilege register 114k (bit) may be set to A4 alter a privilege level. If the conforming privilege bit 114k is set, a privilege level 114b of a descriptor register 102 may be reset to conform to a privilege level of a called segment 70. Typically, not all attribute registers 114 are functional or meaningful for all descriptor registers 102. For example, a stack size register 114j is meaningful only for a descriptor register 102b corresponding to a stack segment selector register 104b. Similarly, a conforming privilege register 114k has meaning only for a descriptor register 102a corresponding to a code segment selector register 104a.

Hidden cache descriptor registers 100, 102 are limited if set directly by an operating system executed by a processor 12, according to a mode selected. If real mode is selected, such as by the inherent nature of an operating system, the segment limits 112 are automatically fixed at 16-bits. Likewise, the attribute registers 114 are fixed. The attribute registers 114, in real mode are identical to those illustrated in the descriptor registers 102 of FIG. 3.

In protected mode, the hidden cache descriptor registers 100, 102 may take on values that are unique per segment descriptor, as illustrated in the descriptor registers 102 in FIG. 4. In FIG. 4 an entry of Y means yes, an entry is fixed, while a letter N indicates that an entry is not fixed. The letter d indicates that an item is unique per segment descriptor, or may be defined independently per segment descriptor 102. Likewise, the letters p, r, w indicate that values may be provided independently per segment descriptor 102, but must be present, readable, or writable, respectively to avoid certain exceptions.

General registers 120 are 32-bits long. However, each of the general registers 120a–120h may be identified in a 16-bit, or even an 8-bit mode. The registers 122 (e.g. 122a–122h) are 16-bit registers. The first four 16-bit, general registers 122a–122d may be accessed as 8-bit registers 124, 126. Thus, each of the registers 124a–124d may be referred to as a high register 124 while the registers 126a–126d may be referred to as low registers 126.

Referring now to FIG. 4, a selector 104 (segment selector register 104 or segment register 104) may contain a table indicator 130. The table indicator 130 and an index 132 indicate where a descriptor 102 or descriptor register 102 may be found, including which table 134, 136. A local descriptor table 134 typically identifies descriptors 102 that relate to a particular portion of the memory 20 allocated to a specific process. By contrast, a global descriptor table 136 typically includes descriptors 102 addressable, and thus uniquely identifiable, at any addressable location in the memory device 20.

In the example of FIGS. 3–4, the selector 104a of the segment selector registers 96 illustrates the relationship between the selectors 104, descriptor tables 134, 136, and the individual descriptor registers 100, 102 or hidden cache descriptor registers 100, 102. The base address 110 identifies a segment base 72, while a limit 112 indicates a segment limit 74. The offset 82 summed 84 with the base address 110 provides a linear address 86 pointing the target address 160 within a segment 70.

By flat-model is meant that an offset constituent 82 of an address is sufficiently large to address the entire memory 20 or address space. Accordingly, in flat-model execution, the offset 82 pointing within any segment may address any number of bytes up to the total number of bytes in the entire address space. One may also think of the number of bits in an individual offset 82 as being sufficient to accommodate every possible address location within the entire address space.

In an apparatus and method in accordance with the invention, the segment registers 104 are completely obviated. To obtain flat-model execution, each of the base physical address registers 110 within the hidden cache descriptor registers 100, 102 is set to a value of 0. Thus, the entire register (from 32 up to 48 bits) may be filled with zeros.

Likewise, each of the segment limit (length) registers 112 in the hidden cache descriptor registers may be set to a single common value. The common value may be a 32 bit maximum value of the total address space, whether or not space exists in memory 20.

Thus, the base address 72, 110 for every segment 70 is zero, and the segment length 74, 112 permitted for each segment 70 is the total addressable space. The code segment register 104a, the data segment register 104c, the extra segment register 104d, and the stack segment register 104b, may all be set (as well as the FS 104e and GS registers 104f) to have an effective base 72, 110 at zero. Each 96 may be permitted to address the entire 32-bit address space of 4 gigabytes of the example.

When an address 86 is required, an individual application may simply provide a number within the total addressable (32 bit) maximum. That number will be treated as an offset 82 from the base address 72, 110 of zero. Accordingly, an op-code (instruction identifier) or data value at the offset value 82 will be directly addressable. No reference to the segment register transformation will be required as under the old X86 architecture. Thus, the hardware limitations that would ordinarily be built into a 20-bit addressing scheme are eliminated.

In an apparatus and method in accordance with the invention, the descriptor registers 100 may be loaded from the 11 descriptor definition 140 stored in the memory device 20. The descriptor definition 140 when stored in a memory device 18, 20, looks quite different from the descriptor registers 100, 102 in the cache registers 90.

A segment base 142 includes only the first 16-bits of a base address 110. A segment base 144 includes the bits 16–23, while a segment base 146 includes the bits 24–31. Likewise, a segment limit 148 includes bits 0–15 corresponding to a segment limit (limit register) 112. A segment limit 150 corresponds to the remaining bytes 16–19 of the 20-bit limit 112. Again, one may speak of the registers 110, 112, or the respective values of the addresses 72, 74, corresponding thereto, interchangeably. Nevertheless, the data 142, 144, 146, 148, 150, is placed into the appropriate registers 110, 112 in order to point to the appropriate address 72, 74 defining a segment 70.

An access rights byte 152 may include some or all of the data to be stored in the attribute registers 114. As illustrated, the granularity bit 114d of a hidden cache descriptor register 102 may be stored separately from the access rights byte 152, as a G bit 154. Similarly, the default execution bit, D-bit 156, may be stored separately from the access rights byte 152. Thus, in the illustrated embodiment of FIG. 4, the access rights byte 152, together with the G bit 154, and D bit 156 provide the contents of the attribute registers 114.

Thus, a descriptor definition 140 may be loaded into the hidden cache descriptor registers 100, 102 for combining with an offset 82 acting as an effective address 82. Accordingly, a target address 160 in a selected segment 70 may be addressed.

Figure 5:
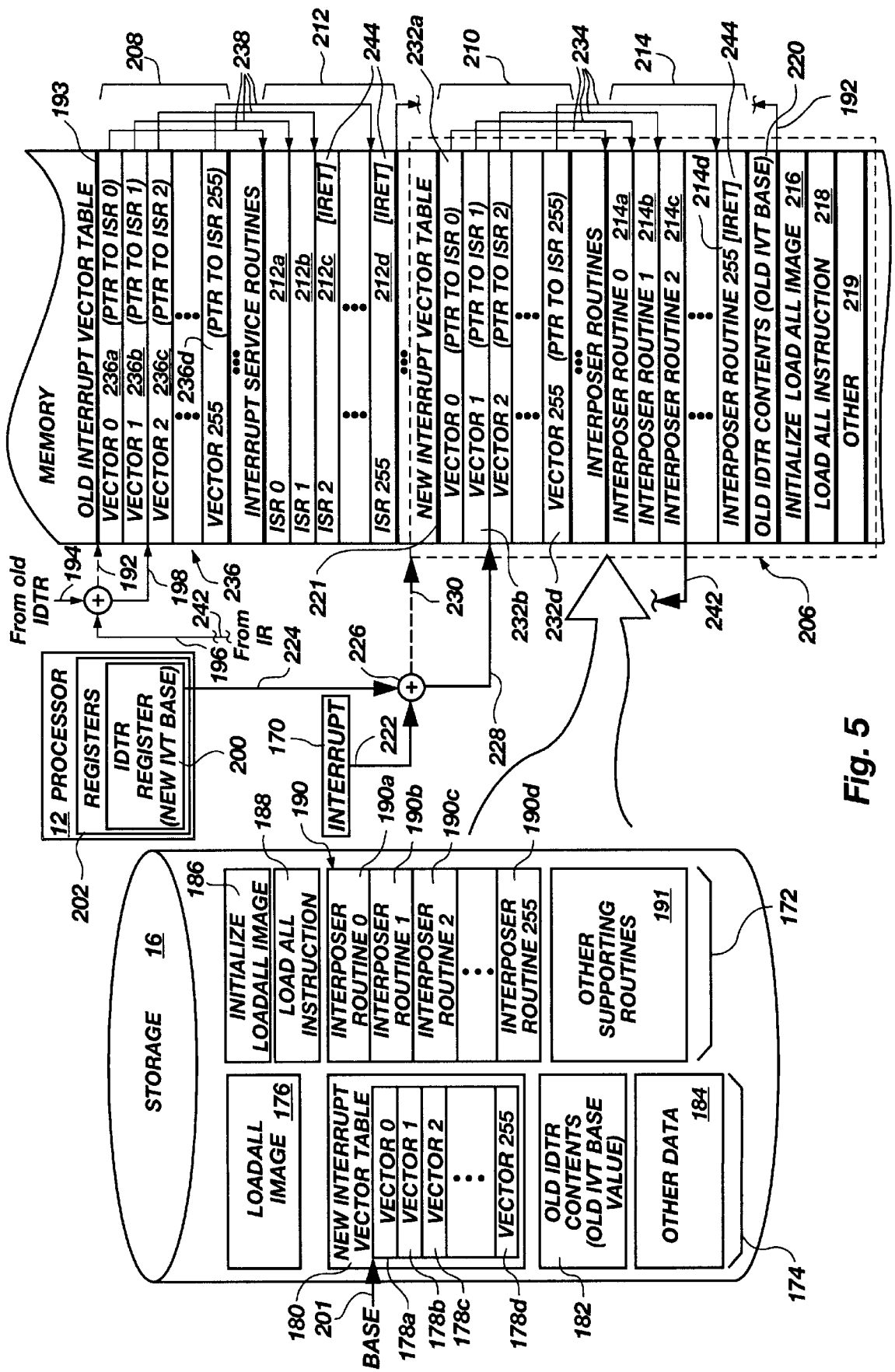
FIG. 5 is a schematic block diagram of data structures embodied in storage and memory for execution by a processor or FIG. 1, using the registers and addressing of FIGS. 2–3.

Referring now to FIG. 5, an apparatus and method in accordance with the invention may load the hidden cache descriptor registers 100 (see FIGS. 3–4) to provide real-mode 32-bit execution by a processor 12. However, a processor 12 must deal with interrupts 170. Interrupts 170 may change the contents of the hidden cache descriptor registers 100, 102.

As a practical matter, an application should not change the contents of any of the segment registers during execution in flat-model. The 32-bit compilers installed today do not change the contents of segment registers. Likewise, an application developer should not write to the segment registers 96 or flat-model execution might be destroyed in a processor 12 operating in accordance with the invention.

In order to eliminate an interrupt 170 making an improper modification of the contents of a segment register 96 and its associated hidden cache descriptor registers 100, interposer routines 214 may be created to deal with interrupts 170. A state of the hidden cache descriptor registers 100 must be saved and restored occasionally or periodically.

To facilitate 32-bit flat-model execution, certain executables 172 and corresponding data 174 may be stored in a storage device 16. Alternatively, the executables 172 and data 174 may be stored in memory 20. However, as a practical matter, the memory space 20 is used only for supporting the execution of the processor 12. Thus, logically, the data structures 172, 174, whether executable 172 or non-executable may be viewed logically in the storage device 16. A LOADALL image 176 contains the data or image 176 to be loaded into the hidden cache descriptor registers 100.

Vectors 178 (e.g. vectors 178a–178d) may form a new interrupt vector table 180. The new interrupt vector table 180 or new IVT is created to cooperate with the interrupt 170. An old IDTR contents 182 may identify a supplanted or old base value of an interrupt vector table to be replaced by the new interrupt vector table 180. Other data 184 may support other operations of the processor 12.

An initialize LOADALL image 186, also called initialize 186 or may be executed by the processor 12 to provide an environment suitable for execution of a LOADALL instruction 188. The LOADALL instruction 188 loads the LOADALL image 176 into memory 20.

Interposer routines 190 are the workhorses of an apparatus and method in accordance with the invention. Each of the interposer routines 190a–190d corresponds to a particular value or level of an interrupt 170. As with other data 184 that may be required for the proper care and feeding of the processor 12, other supporting routines 191 may be included to provide the general housekeeping of the processor 12 and the memory device 20 in implementing certain preferred embodiments of an apparatus and method in accordance with the invention.

In ordinary operation, a signal 192 from an interrupt descriptor table register (IDTR) provides a value corresponding to a base 193 of an old interrupt vector table 208. The signal 192 is simply signal 194 from an old IDTR. The signal 198 comes from a signal 194 received from an old IDTR and a signal 196 received from an interrupt 170. The resulting signal 198 or pointer 198 points to an interrupt vector designated by the interrupt 170. The old IDTR value for the signal 194 is typically stored in the IDTR 200 or IDTR register 200.

However, in accordance with the invention, the register 200 stores a value corresponding to a new interrupt vector table base, logically represented by the new interrupt vector table base 201. An IDTR 200 is one of the registers 202 of the processor 12. The registers 202 may include the hidden registers 90 and visible registers 92.

A compile and load process 204 executed by the processor 12 loads the data structures 206 into the memory device 20 for execution by the processor 12. The old interrupt vector table 208 remains. However, the new interrupt vector table 210 is loaded to deal directly with the interrupts 170.

The interrupt service routines 212 remain in memory 20. However, interposer routines 214 will be pointed to by the vector table 210 in response to the interrupts 170. The initialize 216 or initialize LOADALL image 216 is stored in memory 20 as a compiled image of the initialize 186. Similarly, the LOADALL instruction 218 is a compiled version of the LOADALL instruction 188. The other data 184 and other supporting routines 191 may also be copied, compiled and loaded, and the like, as appropriate, being stored as the other contents 219 in memory 20. The old IDTR contents 220 may be received directly from an IDTR 200 before the IDTR is loaded with the value of the new interrupt vector table base 221. Alternatively, the old IDTR contents 182 may be known in advance and loaded into the old IDTR contents 220. The old IDTR contents 220 contains the value of a pointer. The pointer 192 (signal 192) points to the old interrupt vector table 208, and specifically to the base 193 thereof.

In operation, the processor 12 provides a value corresponding to the base address 221 of the new interrupt vector 210 from the IDTR 200. An interrupt 170 provides, or may be represented by, a signal 222 which, with the signal 224 representing the base address 221 stored in the IDTR 200 is summed 226 to provide a pointer 228 or signal 228. As with the signal 192 pointing to the base address 193, the IDTR signal 224 provides a pointer 230 to the base address 221.

Thus, an interrupt 170 and the IDTR 200 result in a pointer 228 to a vector 232 (e.g. vector 232*c*, in this instance). Each of the vectors 232 (e.g. 232*a*, 232*d*) points to, or may be represented by a pointer 234 to a respective interposer routine 214 (e.g. 214*a*–214*d*). The vectors 232 replace, so far as the interrupt signal 222 is concerned, the old vectors 236. The old vectors 236 still serve as, contain, or represent, pointers 238 to the interrupt service routines 212 (e.g. 212*a*–212*d*) Moreover, the vectors 236 will still be used to access the interrupt service routines 212.

However, the new interrupt vector table 210 and the interposer. routines 214 are logically hooked into the operating system of the processor 12. For example, an interrupt 170 provides an interrupt signal 222 which, with the IDTR signal 224 from the IDTR 200, provides a pointer 228 to a vector 232 (e.g. vector 232*c*). The vector 232 (e.g. 232*c*) points to a corresponding interposer routine 214 (e.g. interposer routine 214*c*). The interposer routine 214 saves the state of the hidden cache descriptor registers 100. The interposer routine 214, then simulates the interrupt signal 222, or interrupt 170, with a signal 242. The signal 242 becomes the input 196 summed with the signal 194. Meanwhile, the signal 194 is provided as the signal 192 or value 192 from the old IDTR contents 220. Accordingly, an output signal 198 simulates the interrupt signal 222, pointing to a vector 236 (e.g. vector 236*c*, in this example) from the vector table 208. The vector 236 (vector 236*c*) points 238 to the respective interrupt service routine 212 (e.g. interrupt service routine 212*c*). The interrupt service routine 212 is executed, followed by an interrupt return 244. The interrupt return 244 returns control to a calling routine. The calling routine is the original interposer routine 214 (e.g. 214*c*). The interposer routine 214 then restores the state of the hidden cache descriptor registers 100 to the original, saved, 32-bit, real-mode, flat-model execution state. The processor 12 may continue to access the memory 20, and the interrupt 170 has not altered the state of the hidden cache descriptor registers 100.

Figure 6:
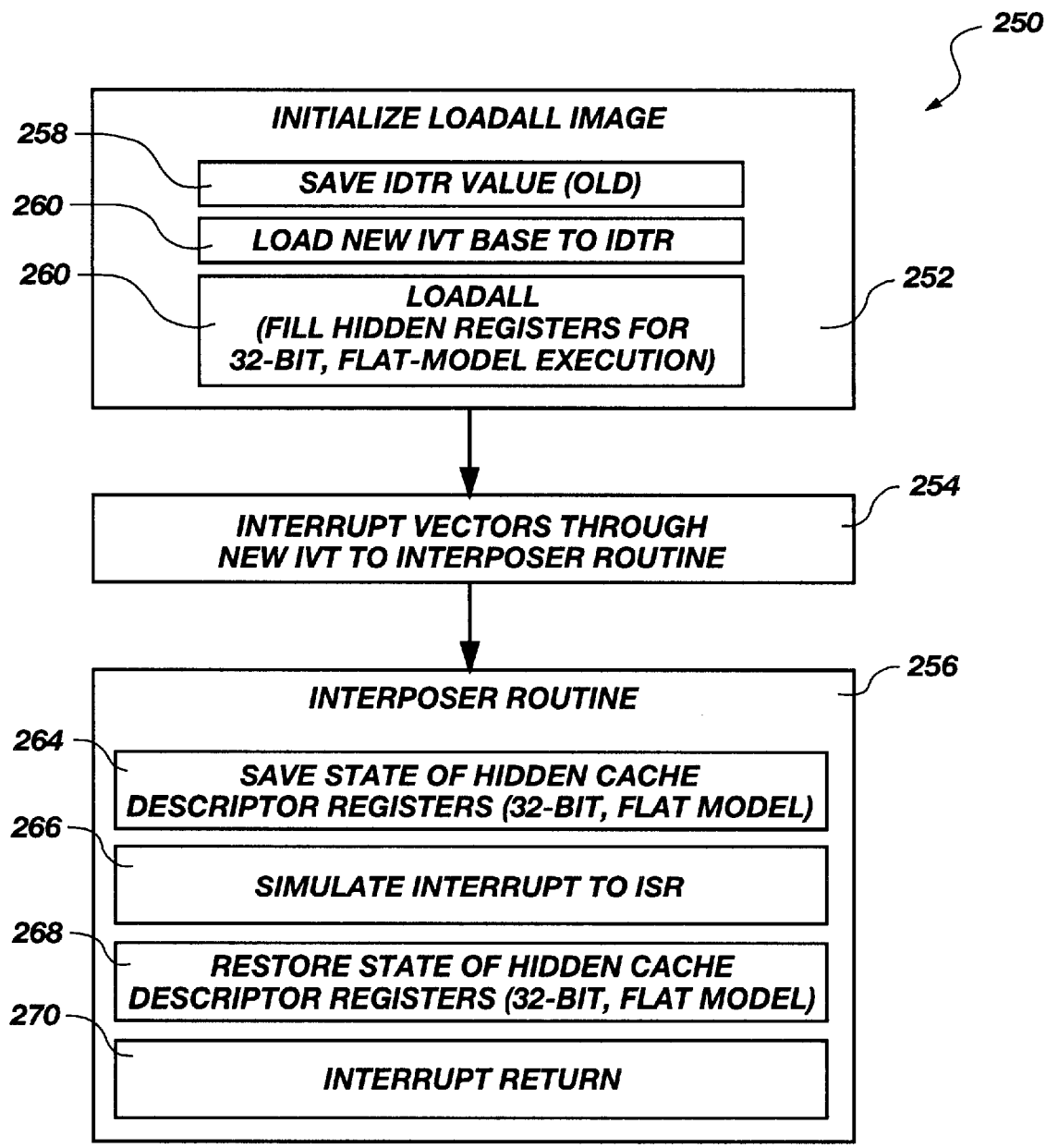
FIG. 6 is a schematic block diagram of a method for implementing the apparatus and data structures of FIGS. 1–5 in accordance with the invention.

Referring now to FIG. 6, a process 250 illustrates the steps for navigating the data structures 206 and pre-existing data structures 208, 212 in memory 20. An initializing step 252, an initialize LOADALL image 252, is executed by the processor 12. Initializing step 252 executes a save 258, a load 260, and a LOADALL 262.

The save 258, will save an old IDTR value 220, originally stored in the IDTR 200. The load step 260, loads a new value, a new base address 221 corresponding to the new interrupt vector table 210 into the IDTR 200 or IDTR register 200.

The LOADALL step 262 executes a standard LOADALL instruction. The LOADALL instruction 188 is a standard instruction available to an operating system for loading the hidden cache descriptor registers 100. In the LOADALL step 262, the LOADALL instruction 188 fills the hidden cache descriptor registers 100, 102 with the base addresses 100, limits 112, and attributes 114 required to implement a 32-bit, flat-model execution in accordance with the invention.

Loading of all internal registers 20, that is, hidden registers 90 as well as visible registers 92, may be by use of the LOADALL instruction 188. LOADALL 188 is a test instruction. It is not normally used by programmers. The LOADALL instruction is powerful and dangerous. The data structure (image) 176 in memory 20 is associated with the LOADALL instruction 188.

In one implementation of a method and apparatus in accordance with the invention, the data structure 176 in memory 20 may be loaded with the contents desired for the segment registers 96. This includes all of the hidden cache descriptor registers 100, 102, the attribute registers 114, access rights registers 114, the base physical address register 110, and the limit 112 or segment-length registers 112. The LOADALL instruction 188 loads all these registers 96, 100.

Likewise, the interrupt descriptor table register 200 usually contains the base address 193 of the interrupt vector table 208. Thus, when an interrupt 170 is received, it is vectored directly through the interrupt vector table 208 to interrupt service routine 212. In an apparatus and method in accordance with the invention, an interposer routine 214*a* is programmed to direct execution into each appropriate interrupt service routine 212. Meanwhile, the LOADALL instruction 188 loads an interrupt vector table 210 with vectors 232*c* (values) targeting or pointing to the proper interposer routines 214. The interrupt service routines 212 are properly executed, but may have the 32-bit addressing of the flat model.

Referring again to FIG. 6, the vectoring step 254 occurs as the interrupt signal 222 is vectored through the new interrupt vector table 210. Since the IDTR 200 contains the base address 221 of the new interrupt vector table 210, the vectoring step 254 is transparent to the interrupt 170. The vectoring step 254 vectors through one of the new vectors 232 of the new vector table 210 directly to a corresponding interposer routine 214. The interposer routine 214 will return an interrupt return signal when it has completed its execution.

The interposing step 256, in a saving step 264, saves the state of the hidden cache descriptor registers 100, 102, as described. The saved state corresponds to the 32-bit, flat-model execution. Thus, the values in the registers 110, 112, 114 that are saved will effect 32-bit, flat-model execution by the processor 12.

The simulating step 264 provides the signal 192 from the old IDTR contents 220 saved in memory 20 as the input 194 to summed with a signal 242 provided as the input 196. Thus, the interposer routine, has effectively pointed to an original vector 236 that the interrupt 222 would have engaged, had the new vector 210 and interposer routines 214 not been implemented.

As described above, the vector 236 vectors a signal 198 to point 238 to the appropriate interrupt service routine 212, which returns an interrupt return signal 244 upon completion. Control then returns to the original, calling interposing routine 214. The interposer routines and the vector table 210, are thus transparent to the interrupt service routines 212. Upon receiving an interrupt return signal 244 from an interrupt service routine 212 the interposer routine 214 restores 268 the state on the hidden cache descriptor registers 100.

The restoring step 268 and saving step 264 may store the contents of the hidden cache descriptor registers 100 in the other portion 219 of memory 20 dedicated to the support of the data structures 206. The restoring step 268 may thus move the contents of the hidden cache descriptor registers, from their location 219 in memory 20 back into the hidden cache descriptor registers 100.

As the interrupt service routines 212 provide an interrupt return 244, a returning step 270 may provide an interrupt return 244 (see FIG. 5) to the processor 12. The interrupt return 270 or returning step 270 thus renders the interposer routines 214 transparent to the interrupt 170 in processor 12.

Note that the IDTR 200 is effective to initiate execution of the interposer routines 214 by the processor 12. By a simple replacement of the old IDTR value 220 in the IDTR 200 with a pointer 224 to the new interrupt vector table 210, the interposer routines are executed. Of course initialization 252 is completed previously. However, by the judicious use of the vector tables 208, 210, operation is very fast.

Although the Motorola architectures do not have a "descriptor table" as in the INTEL architecture, a memory management unit (MMU) is effectively a vectoring table or map. Mapping registers map the logical addresses within a program to the physical addresses in memory 20. Thus, the MMU does the effective function of the vector table 208.

The access rights portion 114 of each hidden cache descriptor register 102 uses a D/B bit to distinguish 16-bit and 32-bit segment addressing. In an embodiment consistent with the invention, the processor 12 is operating in real mode, yet the D/B bit is set for 32-bit addressing.

The default operation bit (D-bit) determines whether or not an OP-code will be interpreted as a 32-bit OP-code or a 16-bit OP-code. The significance of the two different OP-code types lies in the use of the general registers 94. For example, a move instruction corresponding to an OP-code A1 may act as an operand on either a 16-bit or 32-bit operand.

The difficulty is that the move, for example, will place a 16-bit value (operand) into the AX register 122a, if the D-bit (default operation size bit) has a value of 0 corresponding to 16-bit operation. However, the identical OP-code (A1) will move a 32-bit value (operand) into the EAX register 120a, having a size of 32-bits, if the D-bit (default operation size bit) has a value of 1, corresponding to 32-bit operation. Thus, the 16-bit AX register 122a may be insufficient to hold a 32-bit value.

If a D-bit is set at a value of 1 corresponding to 32-bit operation, the data operated on must be in a 32-bit format. Otherwise, a command to retrieve, move or otherwise operate on data may take the intended data, along with an additional 16-bits of neighboring instructions and data.

For example, instructions and data may reside in close proximity to one another, typically adjacently. Accordingly, an OP-code may apply to neighboring data. A move of a 32-bit data value may try to execute a 16-bit OP-code and the following, in correct 16-bits of data. A following OP-code of some number of bits and enough data to fill in the remaining 16 bits may thus be mistaken for operating data.

A similar but opposite problem may occur if 16-bit operation is intended. An OP-code followed by 32-bit data will execute only on the first 16 bits of the data. Thus, the next adjacent and remaining data will be interpreted as next OP-code, causing confusing and failure of the processing. Thus, OP-codes and data become garbage if the D-bit is not properly set.

Thus, the default operation size bit (the D-bit) is critical, having the responsibility for determining whether or not a computer is operating as a 32-bit or 16-bit processor.

In the INTEL™ X86 architecture, the D-bit is defaulted to a 16-bit operation, a value of 0. Thus, in real mode, the D-bit is in a default position and operation in 16-bit mode.

When the operating system transitions the processor into protected mode, the D-bit is set by the computer at a value of 1 corresponding to 32-bit operation. By changing certain descriptors in a local descriptor table (LDT) 134 or a global descriptor table (GDT) 136, a user may override the D-bit in a 32-bit mode for compatibility with 16-bit applications or data. Otherwise, no readily available mechanism will set the D bit to a value of 1 corresponding to 32-bit operation while operating in real mode.

In an apparatus and method in accordance with the invention, a test instruction 188, the LOADALL instruction 188, is used to load the hidden cache descriptor registers 100, 102. Thus, the D and G bits may be set with the LOADALL instruction in the attributes 114 of the entire bank 100 of hidden cache descriptor registers 102 upon loading.

With only this feature of the invention implemented, however, the hidden cache descriptor registers 100, 102 would immediately be loaded to a new configuration upon receipt of an interrupt 170. Therefore, the mechanism of interposing certain logic to save and restore the state of the hidden cache descriptors 100, 102 eliminates the problem. The interposer routines 214 save and restore the descriptor registers 100, 102 before and after, respectively, servicing of an interrupt 170. The interrupts 170 and their corresponding interrupt service routines 212 are controlled transparently by the interposer routines 214, and thus cannot permanently modify the hidden cache descriptor registers 100, 102.

The granularity bit (G bit) 114d defines the granularity that will be available for a segment size 112. For example, when the G bit is set at a value of 0, the granularity level is 1 byte. A segment limit 112 may normally only be a 20-bit value. This is merely an inherited feature of the INTEL™ X86 architecture. The segment descriptors 102 simply do not have places allocated to hold more than a 20-bit limit value 112.

Accordingly, 20-bit values may address up to approximately one million values. If the G bit is set to 0, then memory is byte-addressable. A single segment 70 may only be one granule times the total segment limit 74, 112. Thus, a segment limit 74, 112 of 16 bits times a shift 78 of one byte is 20 bytes approximately one megabyte of segment size 112.

If the G bit is set to a value of 1, granularity is a single page. A page may have a size of 12 bits corresponding to 4,096 bytes. Thus, the total segment size 112 permitted may be as low as a single page (granularity limit) a segment may be as large as the smallest granule (12 bits corresponding to a value of 4,096 bytes in a page) times the segment limit 112 of 20 bits corresponding to approximately one million.

Thus, the maximum segment size is 4,096 megabytes, slightly over 4 gigabytes of addressable memory space. One may note that the 20 bits of limit 112, added to the 12 bits of the page size (addition of bits is equivalent to multiplication of the corresponding numbers) will provide a net 32 bits of addressable memory space.

With the G bit (granularity) set to a value of 1, and the D bit (default to 32-bit operation) set to a value of 1, the hidden cache descriptor registers 102 may be set to have a physical base address of 0 and a segment limit 112 up to FFFFF. This value corresponds to a hexadecimal five bytes, corresponding to a 20 bit value. Addressing need not employ segments 70. Nevertheless, the segment limit 112 is relied upon to allocate the highest value of addressable memory space.

In summary, an apparatus and method in accordance with the invention provides 32-bit, flat-model, real-mode execution in a processor, while handling interrupts transparently. A LOADALL instruction available to an operating system may load the hidden cache descriptor registers associated with the processor with the base addresses, segment limits, and other attributes consistent with 32-bit, real-mode operation. Thus, real-mode, 32-bit addressing becomes available.

A protected-mode operating system is not required. Interrupts that would normally interfere with the contents of the hidden cache descriptor registers go to a new interrupt vector table. Each vector therein points to a new interposer routine that saves the state of the hidden cache descriptor registers. The interposer routine then simulates the interrupt to the interrupt service routines by vectoring through the old or original interrupt vector table to the appropriate interrupt service routine. After execution, and an interrupt return from the interrupt service routine, the interposer routine restores the state of the hidden cache descriptor registers to the 32-bit, flat-model execution state. The interposer routine may then provide its own interrupt return to the processor, rendering its own operation transparent.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for real-mode, flat-model, 32-bit execution, the apparatus comprising:

hidden cache descriptor registers storing addressing data defining a range of an address space;

a memory device addressable according to the addressing data and storing:

an interrupt vector table containing interrupt vectors, a plurality of interrupt service routines corresponding to the respective interrupt vectors, a plurality of interposer routines to control calling of the interrupt service routines and to provide pre-processing operations and post-processing operations on the hidden cache descriptor registers in association therewith, and an enabling executable effective to load the hidden cache descriptor registers, initialize the interrupt vector table with pointers to the interposer routines, bind the pointers to respective original interrupt vectors replaced thereby, and provide the interposer routines; and a processor operably connected to the memory device for executing the enabling executable, interposer routines, and the interrupt service routines.

2. The apparatus of claim 1, wherein the interposer routines are effective to instruct the processor to:

save the state of the hidden cache descriptor register, simulate the interrupt to the interrupt service routine, and restore the state of the hidden cache descriptor register.

3. A memory device containing data structures comprising:

an interrupt vector table containing interrupt vectors, a plurality of interrupt service routines corresponding to the respective interrupt vectors, a plurality of interposer routines for calling respective interrupt service routines and to provide pre-processing operations and post-processing operations associated therewith, and an enabling executable effective to load the hidden cache descriptor registers, initialize the interrupt vector table with pointers to the interposer routines, bind the pointers to respective original interrupt vectors replaced thereby, and provide the interposer routines to a processor.

4. The memory device of claim 3, wherein the memory device further contains a LOADALL image to be copied into the hidden cache descriptor registers defining a range of an address space.

5. The memory device of claim 3, wherein the range corresponds to substantially more than one megabyte of address space.

6. A method for real-mode, flat-model, 32-bit execution, the method comprising:

providing hidden cache descriptor registers storing addressing data defining a range of an address space;

providing a memory device addressable according to the addressing data and storing:

an interrupt vector table containing interrupt vectors, a plurality of interrupt service routines corresponding to the respective interrupt vectors, a plurality of interposer routines for calling respective interrupt service routines and to provide pre-processing operations and post-processing operations associated therewith, and an enabling executable effective to load the hidden cache descriptor registers, initialize the interrupt vector table with pointers to the interposer routines, bind the pointers to respective original interrupt vectors replaced thereby, and provide the interposer routines;

providing a processor operably connected to the memory device for executing the enabling executable, interposer routines, and the interrupt service routines; and executing a selected interposer routine, in response to a received interrupt, to save the state of the hidden cache descriptor registers, simulate to an appropriate interrupt service routine the received interrupt, and restore the state of the hidden cache descriptor registers.

7. The method of claim 6, further comprising:

loading the hidden cache descriptor registers with addressing data corresponding to flat-model addressing of the memory device.

8. The method of claim 6, wherein the interrupt corresponds to a pointer stored in the interrupt vector table to correspond to an interposer routine programmed to:

save the state of the hidden cache descriptor registers, simulate to an appropriate interrupt service routine the received interrupt, and restore the state of the hidden cache descriptor registers.

9. The method of claim 6, further comprising:

transferring control of the processor to an interposer routine, bound to the interrupt vector corresponding to the interrupt and programmed to save the state of the hidden cache descriptor register, transferring control of the processor to the interrupt service routine to service the interrupt, and transferring control of the processor to the interposer routine to restore the state of the hidden cache descriptor register.

10. A method for flat-model execution by a processor, the method comprising:

receiving an interrupt directed to a processor in an operational state;

providing an address stored in an interrupt vector table;

transferring control of the processor to an interposer routine bound to the address and executable by the processor;

saving by the interposer routine the state of the interrupt vector table;

simulating the interrupt to an interrupt service routine;

executing the interrupt service routine by the processor;

restoring the state of the interrupt vector table by the interposer routines; and returning control of the processor to the operational state existing before receipt of the interrupt.

11. The method of claim 10, wherein the hidden registers are address registers identifying an address space, and wherein the address space corresponds to a number greater than 20 bits.

12. An apparatus for real-mode, flat-model, 32-bit execution, the apparatus comprising:

a processor containing hidden cache descriptor registers storing addressing data defining a range of an address space;

a memory device, operably connected to the processor, and addressable thereby according to the addressing data and storing data structures comprising:

interrupt service routines executable by the processor in response to an interrupt, interposer routines executable by the processor for intercepting the interrupt and responding thereto.

13. The apparatus of claim 12, wherein the data structures further comprise an old interrupt vector table containing old interrupt vectors, corresponding to the respective interrupt service routines, to vector the interrupt to the interrupt service routines; and a new interrupt vector table containing new interrupt vectors to intercept the interrupt and vector the interrupt to the interposer routines.

14. The apparatus of claim 13, wherein the processor further comprises an interrupt descriptor table register storing a new pointer pointing to the new interrupt vector table.

15. The apparatus of claim 14, wherein the data structures further comprise an old pointer pointing to the old vector table and useable by the interposer routines to vector a signal to the interrupt service routines through the old vector table to emulate the interrupt to the interrupt service routines.

16. The apparatus of claim 12, wherein the data structures further comprise an initializing executable effective to load the hidden cache descriptor registers to operate with flat-model addressing.

17. The apparatus of claim 16, wherein the processor further comprises an interrupt descriptor register, and wherein the initializing executable is further programmed to:

initialize a new interrupt vector table;

save an old pointer, pointing to the old vector table; and load into the interrupt descriptor table register a new pointer pointing to the new interrupt vector table for vectoring the interrupt to the interposer routines.

18. The apparatus of claim 17, wherein the old pointer is saved from the interrupt descriptor table register before loading the new pointer thereinto.

19. The apparatus of claim 12, wherein the interposer routines are further programmed to:

save a state of the hidden cache descriptor registers, emulate the interrupt to the interrupt service routines, and restore the state of the hidden cache descriptor registers after execution of a selected interrupt service routine servicing the interrupt.

* * * * *